United States Patent [19]
Smith

[11] Patent Number: 5,516,298
[45] Date of Patent: May 14, 1996

[54] CABLE HARNESS FOR OFFICE FURNITURE

[75] Inventor: Robert H. Smith, Charlotte, N.C.

[73] Assignee: Specialty Lighting, Shelby, N.C.

[21] Appl. No.: 206,492

[22] Filed: Mar. 4, 1994

[51] Int. Cl.$^6$ ..................................................... H01R 13/44
[52] U.S. Cl. .......................... 439/131; 439/536; 439/142; 439/31
[58] Field of Search ............................. 312/226; 174/48, 174/49; 439/535, 536, 540, 131, 138, 142, 31

[56] References Cited

U.S. PATENT DOCUMENTS

| | | | |
|---|---|---|---|
| 2,306,209 | 12/1942 | Elofson et al. | 45/70 |
| 3,883,202 | 5/1975 | Konig | 312/223 |
| 4,094,256 | 6/1978 | Holper et al. | 108/50 |
| 4,372,629 | 2/1983 | Propst et al. | 312/223 |
| 4,654,756 | 3/1987 | Wilson et al. | 361/428 |
| 4,734,826 | 3/1988 | Wilson et al. | 361/428 |
| 4,747,788 | 5/1988 | Byrne | 489/131 |
| 4,792,881 | 12/1988 | Wilson et al. | 361/428 |
| 4,838,175 | 6/1989 | Hauville | 108/25 |
| 4,984,982 | 1/1991 | Brownlie et al. | 439/131 |
| 5,122,069 | 6/1992 | Brownlie et al. | 439/131 |
| 5,272,277 | 12/1993 | Humbles et al. | 174/48 |
| 5,340,326 | 8/1994 | LeMaster | 439/540.1 |

FOREIGN PATENT DOCUMENTS

| | | |
|---|---|---|
| 73.977 | 10/1960 | France . |
| 2091547 | 8/1982 | United Kingdom . |

OTHER PUBLICATIONS

Dar/Ran POWERCOMM Cable Harness Drawing, dated Sep. 11, 1990.

Primary Examiner—P. Austin Bradley
Assistant Examiner—Jill DeMello
Attorney, Agent, or Firm—Bell, Seltzer, Park & Gibson

[57] ABSTRACT

A cable harness for managing cables originating from devices supported by an office work surface and from external power and telecommunication sources is disclosed. The harness comprises a stationary plate and a carrier plate. The stationary plate has an upper edge portion and a front surface adapted for fixed attachment with an upright wall of a furniture system. The carrier plate has a front surface, an opposing rear surface, and a lower edge portion pivotally interconnected with the stationary plate upper edge portion. The carrier plate includes a first plurality of apertures configured to receive electrical power receptacles serially aligned in a first lower row, and further includes a second plurality of apertures configured to receive electronic cable connectors serially aligned in a second upper row. The first lower row is located between the carrier plate lower edge portion and the second upper row. The carrier plate is pivotable between a closed position, in which the carrier plate front surface and the stationary front surface each face forwardly, and an open position, in which the carrier front surface faces downwardly and rearwardly and the stationary plate front surface faces forwardly.

20 Claims, 4 Drawing Sheets

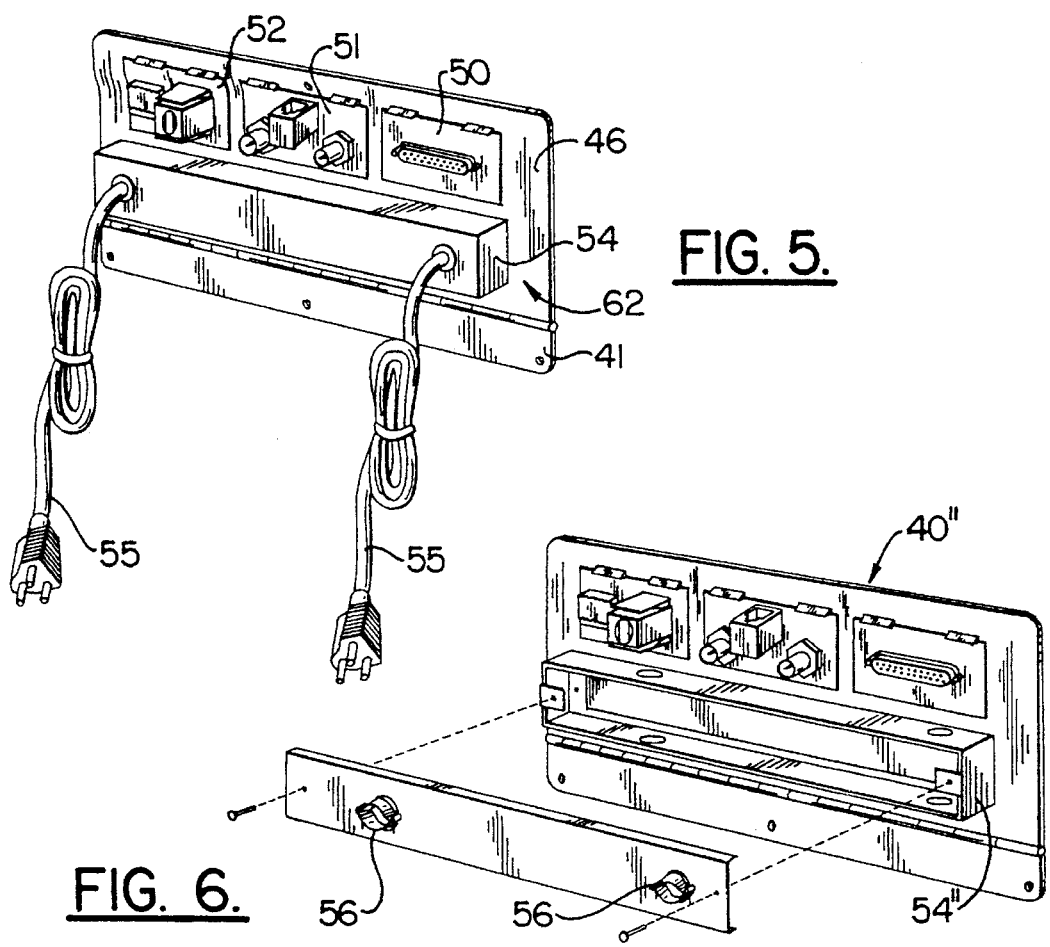
FIG. 5.
FIG. 6.
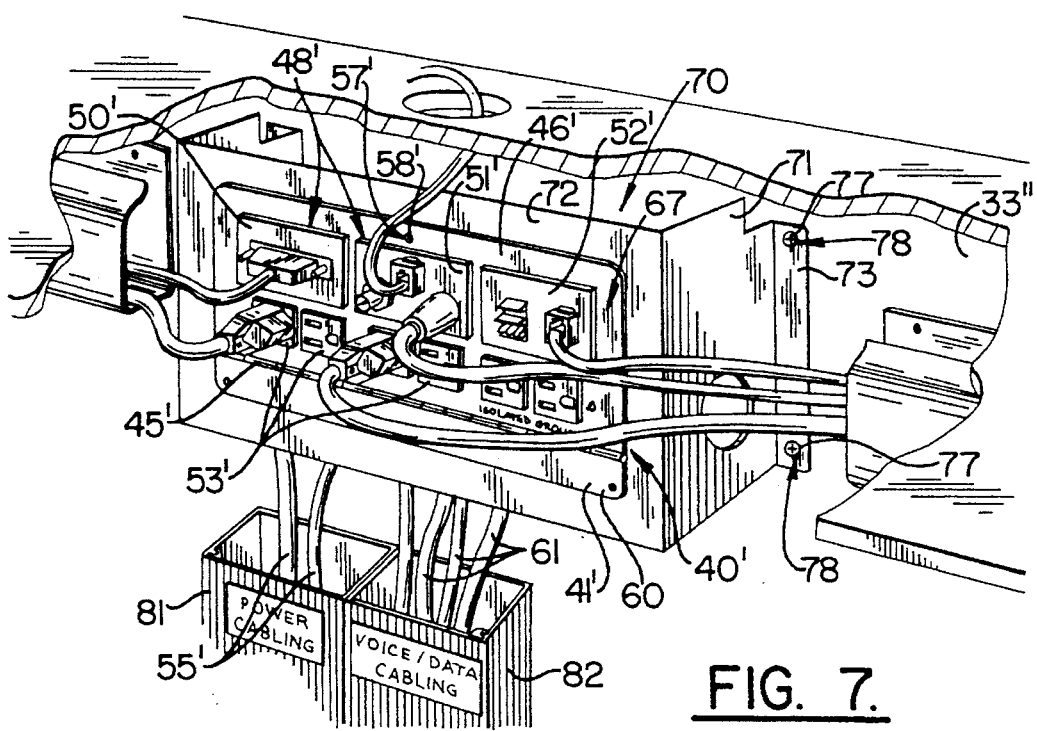
FIG. 7.

CABLE HARNESS FOR OFFICE FURNITURE

FIELD OF THE INVENTION

This invention relates generally to electronic cables, and more specifically relates to a device for facilitating the placement of cables in relation to furniture.

BACKGROUND OF THE INVENTION

Recently, a trend in office environments has been to include an increasing number of electric, electronic, and telecommunication devices in individual work spaces. For example, a single desk or work station may include a telephone, a facsimile machine or access thereto, a computer which functions in a "stand-alone" mode or which is linked to other computers within the same or with one or more remote office environments, a printer linked to the computer and optionally to a facsimile machine, and dictation equipment that may be linked to a remote recorder in addition to simple electrical devices such as lamps, electric pencil sharpeners, and calculators. Each of these devices requires electrical power with the requisite power cord for operation; in addition, many devices, such as a computer, printer, and facsimile machine, require additional cables which provide the pathway for voice or data signals between a source of these signals and the device. As a result, the typical desk can be quite disordered with tangles of numerous cables attached to and between these devices and power and data sources.

The problem of cord management has been addressed in a number of different ways. In particular, devices can be added to the furniture of a workstation itself to accommodate cables. For example, U.S. Pat. No. 4,372,629 to Propst et al. discloses a device that can be mounted within a channel located between the work surface of a desk and an upright wall mounted above the rear portion of the work surface. The device includes a hinged plate upon which is mounted a power receptacle strip. The plate is movable between a generally horizontal closed position, in which the plate covers the channel and the power receptacles face downwardly, and a generally vertical open position, in which the power receptacles face away from the vertical wall (toward the front portion of the desk work surface) and thus can be accessed for the insertion or removal of power cords for electrically-powered devices. When the cover is in the closed position, power cords connected with the power strip exit the channel between the bristles of brushes that contact the rear edge of the work surface and thus hide the channel and its contents from view. The power strip is attached to a power cord that is connected to an "energy core" mounted to the upright wall. The device disclosed in Propst et al. fails to include any means for connecting external telecommunications devices to one or more telecommunication sources. Also, the brushes covering the channel are in view and thus can detract from the appearance of the desk.

Another proposed solution to cable management is shown in U.S. Pat. No. 4,654,756 to Wilson et al., which discloses a power communication module that is located below and mounted integrally with the work surface of a desk. The module, which includes a single row of electrical power receptacles and communication cable receptacles, resides within a cavity beneath the work surface. A door covering the cavity is hingedly connected with the work surface itself; the upper surface of the door thus serves as part of the work surface when the door is in its closed position. Cables to be connected with power sources exit the module from underneath the work surface; cables to be connected with telecommunication devices exit through a gap between the door and the work surface. The use of this device is limited to furniture in which the work surface is sufficiently large that the use of a portion thereof as the aforementioned door is acceptable. Also, the appearance of the furniture is compromised by the presence of the door on the work surface and any telecommunication cables exiting therefrom. Moreover, there is no direct path between cables exiting the module and external sources, which are often located on a building wall behind one or more panels of the workstation.

In view of the foregoing deficiencies of the prior art, it is a first object of the present invention to provide a device that can connect external electrical, electronic, and telecommunication devices positioned on or associated with an office furniture system with sources of these signals and do so in such a manner that the cables entering and exiting the device are effectively managed.

It is another object of the present invention to provide such a device that is configured so that cables exiting the device and leading to the source are hidden from view.

It is an additional object of the present invention to provide a device that is configured so that cables from external devices can be added, removed, and reconnected without the need to move the furniture to which the device is attached.

It is also an object of the present invention to provide such a device that can be simply retrofitted to an existing piece of furniture.

SUMMARY OF THE INVENTION

These and other objects are satisfied by the present invention, which relates to a harness adapted to be attached to a furniture piece that connects external electric, electronic, and telecommunication devices with external sources, and does so in a manner so that the devices connected therewith can be interchanged without the furniture piece being moved. The harness comprises a stationary plate and a carrier plate. The stationary plate has an upper edge portion and a front surface adapted for fixed attachment with an upright wall of a furniture system. The carrier plate has a front surface, an opposing rear surface, and a lower edge portion pivotally interconnected with the stationary plate upper edge portion. The carrier plate includes a first plurality of apertures configured to receive electrical power receptacles serially aligned in a first lower row, and further includes a second plurality of apertures configured to receive electronic cable connectors serially aligned in a second upper row. The first lower row is located between the carrier plate lower edge portion and the second upper row. The carrier plate is pivotable between a closed position, in which the carrier plate front surface and the stationary front surface each face forwardly, and an open position, in which the carrier front surface faces downwardly and rearwardly and the stationary plate front surface faces forwardly. In the open position, the carrier plate rear surface can be forwardly accessed, thus eliminating any need to move the furniture piece in order to reconnect cables attached to the harness. In addition, cables leading between the rear surface of the harness and external sources can be conveniently stored behind the rear wall of the furniture piece, thus removing them from view.

BRIEF DESCRIPTION OF THE FIGURES

FIG. 5 is rear perspective view of the cable harness of FIG. 4 showing power cords configured for connection to a standard electrical power outlet.

FIG. 6 is a exploded rear perspective view of an alternative embodiment of a cable harness which includes apertures for receiving power cords directly from an external power source.

FIG. 7 is a front perspective view of a cable harness embodiment which is mounted to the rear panel of a furniture system via a mounting frame.

DETAILED DESCRIPTION OF THE INVENTION

The present invention will now be described hereinafter in greater detail. The illustrated embodiments are not intended to be limiting; rather, these embodiments are included to provide those skilled in this art with a full and complete understanding of the invention.

In describing the drawings and the invention embodied therein, reference is made to the positional relationship of certain structures to one another on a furniture piece, such as a desk, credenza, or table, which has a generally horizontal work surface and at least one generally vertical wall that is typically positioned adjacent a wall of an office or cubicle. One using the furniture would typically be seated or otherwise positioned at the edge of the work surface that is substantially parallel to and spaced away from the vertical wall. As used herein, a structure is positioned "forwardly" of another if it is nearer to the edge of the work surface that is adjacent the aforementioned user. Conversely, a structure is positioned "rearwardly" of another if it is farther from that work surface edge.

Figure 1:
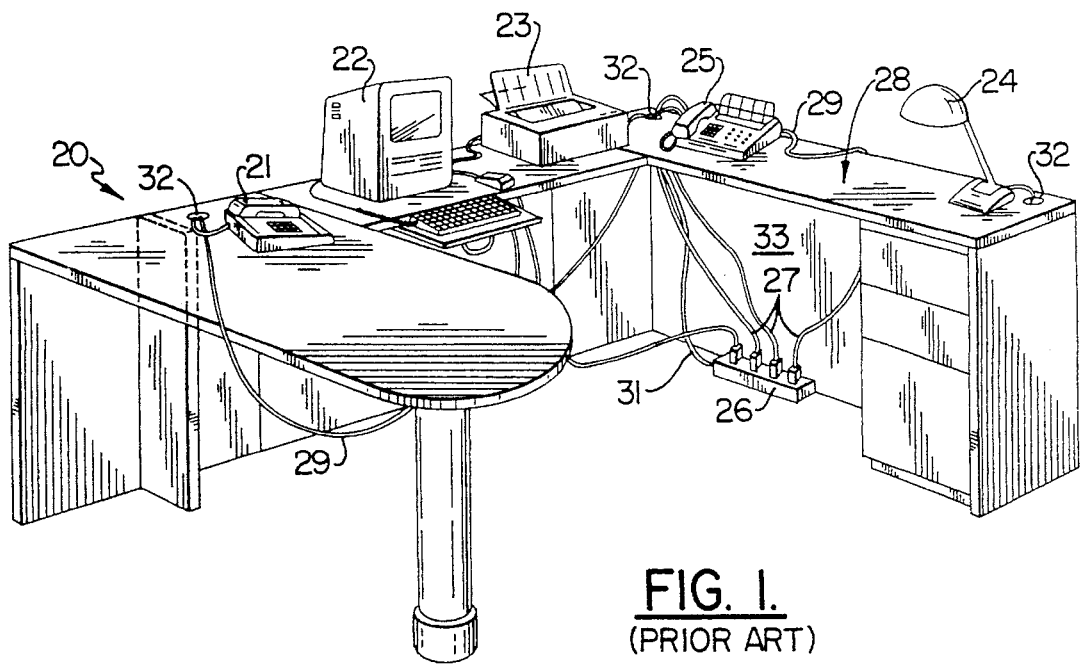
FIG. 1 is a perspective view of an exemplary furniture system lacking a cable management system.

Referring now to the drawings, FIG. 1 shows an exemplary U-shaped furniture system, broadly designated at 20, which has a generally horizontal work surface 28 that is mounted substantially orothogonally to a rear panel 33. The work surface 28 can support a number of individual electric, electronic, and telecommunication devices. Exemplary of these devices are telephones 21 and 25, a computer unit 22 comprising a monitor, a manual monitor selection device, or "mouse" and a keyboard, a printer 23 connected to the computer 22 and to the telephone 25 for facsimile transmissions, and a lamp 24. An electrical power strip 26 is located on the underlying floor beneath the work surface 28. The computer unit 22, printer 23, lamp 24, and telephone 25 are each connected for electrical power to the power strip 26 through power cables 27, which extend through apertures 32 located at three points on the work surface 28. The power strip 26 is connected to an external power source (not shown) through a strip power cord 31, which extends from the power strip 26 through one of the apertures 32 and travels therefrom to the external source. The power source would typically be a wall outlet located behind the rear panel 33, although floor-mounted power outlets and even "hardwired" units connected directly to the power strip 26 are also relatively common. The telephones 21 and 25 are connected to external communication sources (not shown) via voice/data cables 29; these sources would typically be positioned behind rear panel 33.

Each of the exemplary devices illustrated in the furniture system 20 requires at least one cable for connection to either a power source, a data source, or both. As shown in FIG. 1, without any means for capturing the power cables 27 and the voice/data cables 29 into a desirable position, these cables reside wherever they naturally droop after being connected at their respective ends. Such an arrangement can result in tangled cords and can create a disorderly work place, which in extreme cases may be a safety hazard to workers.

Figure 2:
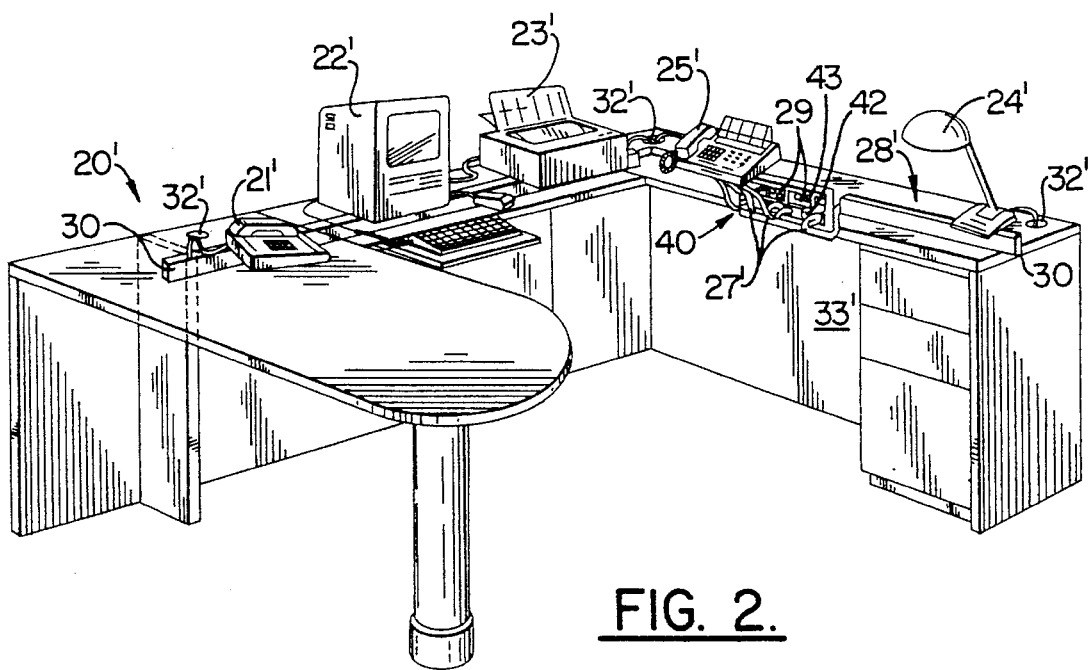
FIG. 2 is a perspective, partial cutaway view of an exemplary furniture system with a cable harness for desirably and advantageously connecting and positioning cables leading to and from devices positioned on the work surface of the furniture system.

In contrast, the exemplary furniture system 20' illustrated in FIG. 2 is quite neat and organized. The furniture system 20' includes on its horizontal work surface 28', the same devices as those illustrated for the furniture system 20 of FIG. 1: telephones 21' and 25', the computer unit 22', the printer 23', and the lamp 24'. These devices are interconnected with each other and with external power and voice/data sources to operate in the same manner as those in furniture system 20 via power cables 27' and voice/data cables 29'. Unlike the furniture system 20 shown in FIG. 1, the furniture system 20' includes a cable harness 40, which is mounted to the vertical rear panel 33' of the furniture system 20' beneath the horizontal work surface 28', and further includes cable channels 30, which are mounted on the vertical panels of the furniture system 20' just beneath the work surface 28'. The channels 30 provide a cable pathway between individual apertures 32' and also between individual apertures 32' and the harness 40. Each of the power cables 27' exits the devices to which they are connected, extends through apertures 32', which are illustratively located at three points on the work surface 28', travels within one or more of the channels 30, and then connects to one of the power receptacles 42 of the harness 40. The voice/data cables 29' follow a similar path from their respective devices to one of the telecommunications connectors 43 located in the harness 40. The harness 40 is then connected to external power sources via power cables 55 exiting the rear portion of the power receptacles 42 (FIG. 3), and to external telecommunication sources via cables (not shown in FIG. 3) attached to the rear surfaces of the connectors 43. The power cables 55 and telecommunication cables travel through a rear access aperture 37 in the rear panel 33'. As a result of the cables 27', 29' being captured within the channels 30 rather than being permitted to droop naturally between their connections, the furniture system 20' is considerably more organized and visually attractive.

As can be observed from FIG. 2, the harness 40 and the rails 30 are preferably mounted on a vertical panel of a furniture piece, such as the rear panel 33', beneath and adjacent the lower side of the work surface 28'. In this position, the harness 40 and rails 30 are hidden from view for most observers of the furniture system 20', and particularly those who are standing. As a result, the aesthetic appearance of the furniture system 20' is not negatively impacted by the inclusion of the harness 40. Preferably, the harness 40 is mounted so that its lower edge is positioned between about 4 and 9 inches from the lower side of the work surface 28, and more preferably between about 6 and 7 inches from the lower side of the work surface 28. Those skilled in this art will appreciate that the harness 40 can be employed with virtually any furniture piece having a base and an upright wall and upon which electric, electronic, or telecommunication devices are placed. Exemplary pieces can be as simple as a conventional desk, table, or credenza having a single work surface, or can comprise multiple pieces arranged as a unit, such as the furniture system 20'.

Figure 4:
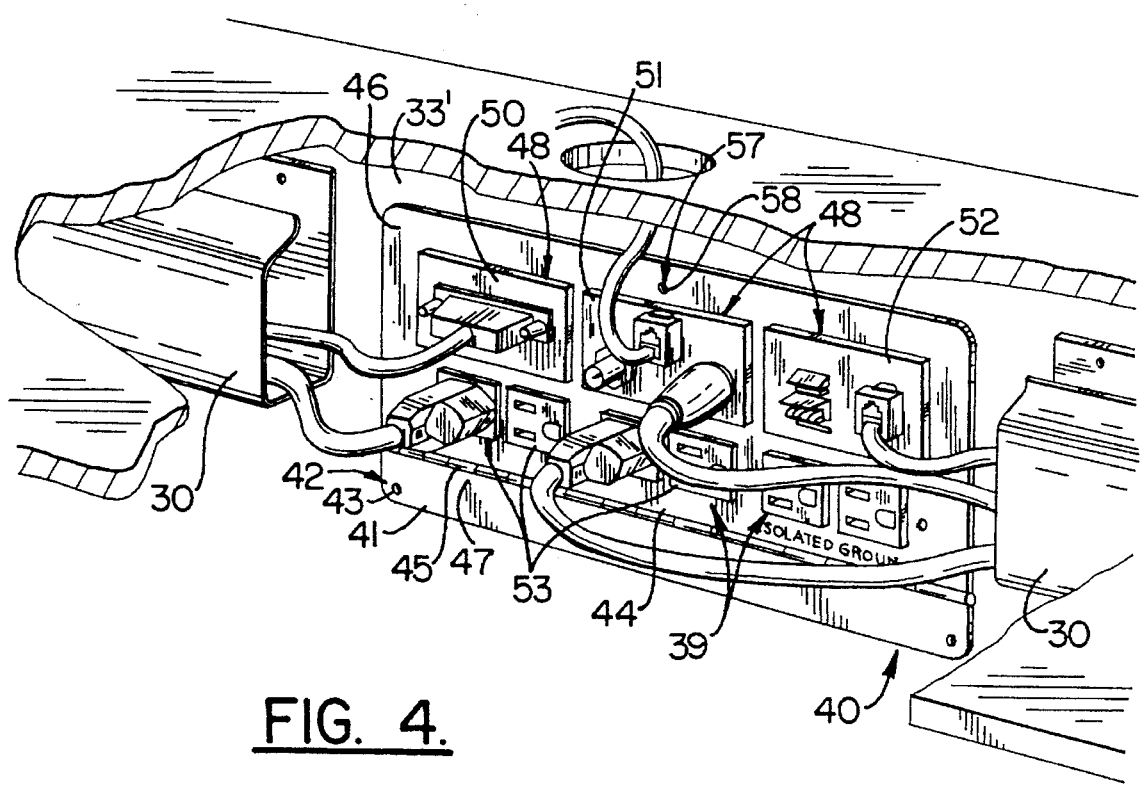
FIG. 4 is an enlarged front perspective partial cutaway view of the cable harness of FIG. 2.

The harness 40, shown in greater detail in FIGS. 4 and 5, comprises a stationary plate 41 and a carrier plate 46, the lower edge portion 44 of which is pivotally interconnected with the upper edge of the stationary plate 41 by hinge 45. The stationary plate 41 is fixedly mounted to and in adjacent contacting parallel relation with the rear panel 33' by a pair of threaded fasteners 43; these fasteners 43 are inserted through fastening apertures 42 located on the lateral portions of the stationary plate 41. The carrier plate 46 is temporarily secured in its closed position to the rear panel 33' by a removable threaded fastener 58, which is inserted through a fastening aperture 57 located in the top central portion of the carrier plate 46. Illustratively and preferably, the harness 40 is mounted so that the carrier plate 46 is disposed above the stationary plate 41, although the harness 40 can be disposed so that the stationary plate 41 is above or beside the carrier plate 46 and still be suitable for use with the present invention.

Illustratively (FIG. 4), the carrier plate 46 includes a row of six serially aligned power receptacles 53 adjacent its lower edge portion 44, although any number of power receptacles can be included in the harness 40 as needed. The power receptacles 53 are nested within power receptacle apertures 39. The receptacles 53 are oriented so that they can receive the prongs of a standard 110 V electrical plug from an electrical device as the plug approaches the receptacle from the front side of the harness 40 (i.e., a "forwardly-approaching" cable). Illustratively and preferably, a pair of the receptacles 53 are configured to provide isolated ground for devices requiring such a configuration. As can be seen in FIG. 5, the receptacles 53 lead into a power junction box 54 mounted opposite the power receptacles 53 on the rear surface 62 of the carrier plate 46. A pair of power cords 55 are electrically connected with the power junction box 54 and extend rearwardly therefrom ("rearwardly-approaching" cables) for connection with an external electrical outlet (not shown), which would typically be positioned on a wall behind the rear panel 33'; these cords extend through the rear access aperture 37 prior to connecting with an external source.

The carrier plate 46 also includes a row of three serially aligned receptacle pairs 48 for voice/data connectors positioned above the power receptacles 53 (FIG. 4). The receptacles 48 are configured to matably receive voice/data connectors appropriate for the devices to be connected to the harness 40. Illustratively, the receptacles 48 accept a printer cable connector 50, a telephone cable connector 51 and a facsimile device connector 52, although those skilled in this art will appreciate that the voice/data receptacles 48 can accept voice/data connectors for cables of various types, including those for facsimile devices, computer network devices, telephones, dictation network units, electronic mail systems, and the like. It should be understood that the receptacles 48 are configured so that the connectors received therein are interchangeable, thereby permitting the connection of additional or different devices to the harness 40 merely by changing connectors within one or more of the receptacles 48. Typically and preferably, the receptacles 48 are between about 1 and 2 inches in height and about 2 and 3 inches in width. External devices are linked to these connectors via cables that emerge from the rails 30 and approach and connect to the connectors from the front side of the carrier plate 46. Cables (not shown) connected with the rear side of the connectors pass through the rear access aperture 37 and to the respective voice/data sources. It should be understood that connectors attached to a receptacle can, if appropriately configured, connect one or more devices residing on the work surface of a desk woth one another.

Figure 3:
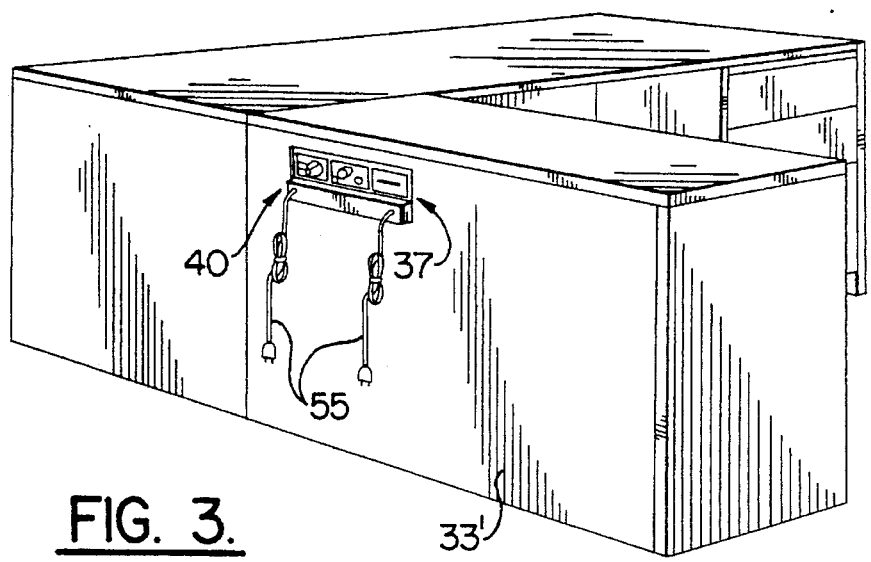
FIG. 3 is a rear perspective view of a furniture system and the harness of FIG. 2 showing the rear access aperture on the rear panel of the furniture system through which power cords exiting the harness travel.

As the power cables 55 and the voice/data cables exiting the rear of the harness 40 travel through the rear access aperture 37, they are free to be stored behind the rear panel 33' of the furniture system 20' (FIGS. 3 and 5). Typically, the furniture system 20' is positioned so that the rear panel 33' is adjacent an office or cubicle wall on which the external power and voice/data sources are mounted. As a result, the cables exiting the rear of the harness 40 can be hidden behind the rear panel 33' and thus can be effectively removed from the operational space of the furniture system 20', therby improving both its apperance and operability.

The channels 30 (FIG. 4) are illustratively elongated open tunnels that extend between apertures 32' on the work surface 28' and the harness 40. Those skilled in this art will appreciate that any means for capturing and guiding cables 27', 29' from the apertures 32' and the harness 40 is suitable for use with this invention. In addition, for certain simple furniture systems it may be determined that the channels 30 are superfluous and thus can be omitted entirely.

FIG. 6 shows an alternative embodiment of the cable harness 40" in which the power cables 55" exiting the junction box 54" are not outfitted with standard power plugs. Instead, the junction box 54" includes a pair of power cable apertures 56 that are configured to receive power cables directly from an external power source. In this configuration, the harness 40" of this embodiment can be permanently connected, or "hard-wired", to the external power source.

An additional embodiment of the harness of the present invention is illustrated in FIG. 7. This embodiment can be used in conjunction with a furniture system that lacks a rear access aperture in its rear wall. The harness 40' is mounted on a mounting frame 70, which includes side walls 71, mounting tabs 73, and a front face 72. The mounting frame 70 is fixed to the rear panel 33" through fasteners 77 which are inserted through apertures 78 in the mounting tabs 73. The front face 72 includes a window 74 (seen in FIG. 8), below which is mounted the stationary plate 41' of the harness 40'. The carrier plate 46' is pivotally connected to the stationary plate 41' through hinge 45'. The power receptacles 53 ' and the voice/data receptacles 48' and their respective connectors 50', 51', 52' are configured and arranged in the same manner as those for the harness embodiment of FIGS. 4 and 5. Power cables 55' exiting the power junction box (not shown) and voice/data cables 61 exiting the connectors 50', 51' 52' feed downwardly behind the frame front face 72 into vertical channels 81, 82; these channels then lead to external sources. The mounting frame side walls 71 are sized so that the front face 72 is spaced away from the rear panel 33" to enable connection of rearwardly-approaching cables 55' and 61 to the rear surfaces of the connectors 50', 51', 52' and the junction box (not shown in FIG. 7). Typically this embodiment is used with furniture systems that are positioned near a floor mounted "tombstone" or "monument" power and voice/data source. It should also be noted that this embodiment can be added to an existing furniture system without having to cut an access aperture in a vertical panel.

Figure 8:
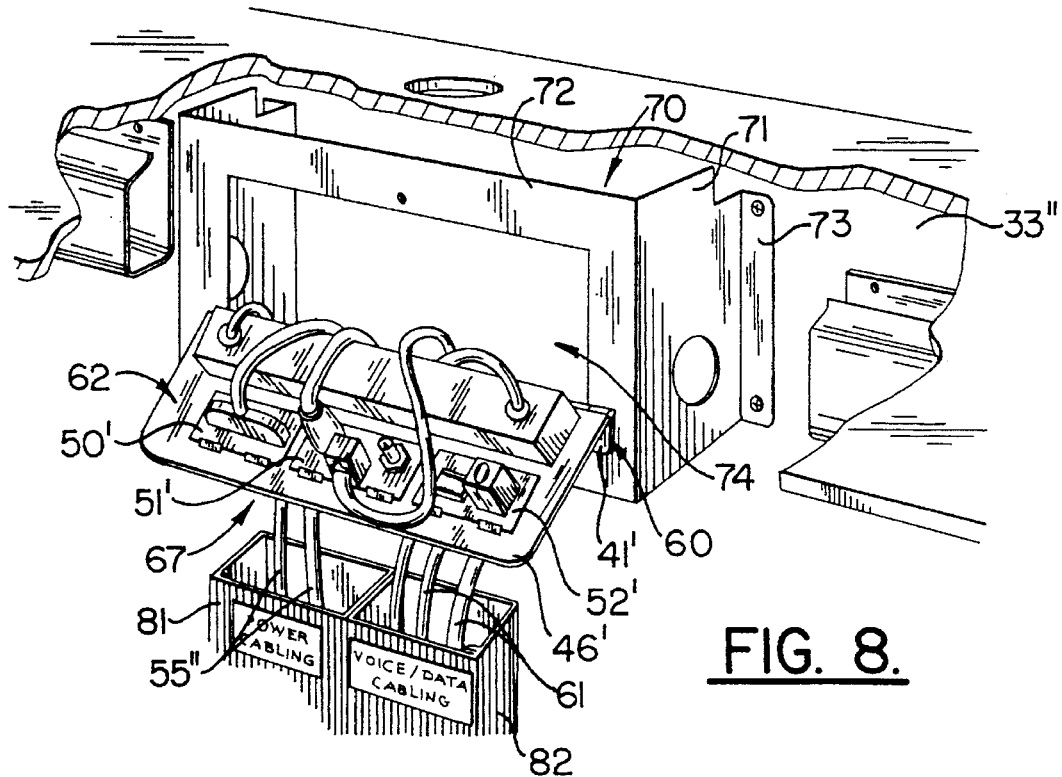
FIG. 8 shows the cable harness of FIG. 7 in its open position, wherein the rear side of the power and telecommunication receptacles can be accessed for reconnection.

Each of FIGS. 4 through 7 illustrates the harness 40 in its closed position, in which the stationary plate front surface 60 and the carrier plate front surface 67 each face forwardly. Illustratively and preferably, these front surfaces 60, 67 are substantially coplanar in the closed position. The rear side of any of these harness embodiments can be accessed as illustrated in FIG. 8, which shows the embodiment of FIG. 7 in its open position. Removal of the fastener 58' from the aperture 57' enables the carrier plate 46' to pivot relative to the stationary plate 42' about the hinge 45' from its closed position shown in FIG. 6 to its open position. As shown in FIG. 8, in the open position the stationary plate front surface 60 faces forwardly and the carrier plate front surface faces downwardly and rearwardly, with the result that the carrier plate rear surface 62 can be forwardly accessed; i.e., an individual facing the front surface of the rear panel 33" can manipulate the cables attached to the rear surfaces of the connectors 50', 51', 52'. In the illustrated and preferred embodiments, the carrier plate 46' pivots so that its front surface 67 forms an angle of between about 10 and 60 degrees, and more preferably been about 10 and 30 degrees, with the stationary plate front surface 60. In this position, the rear side of the carrier plate 46' and the cables attached thereto can easily be accessed without moving any portion of the furniture system 20' to which the harness 40' is attached. Thus reconfiguration of the devices attached to the source cables can be simple and rapid.

The rear surface 62 of the harness can be accessed even though the harness 40' as mounted just beneath the lower side of the work surface 28', as the carrier plate 46' is free to pivot past horizontal and thus does not block access to the rear access aperture 37 (for the embodiments mounted directly to the rear panel 33') or to the window 74 (for embodiments mounted to the rear panel 33" via the mounting frame 70). In addition, the aperture 37 or window 74 is sized to be sufficiently large that an individual accessing the rear surface 62 can reach his hands there through to grasp, manipulate, and connect the cables with the connectors already present or with new connectors.

Figure 9:
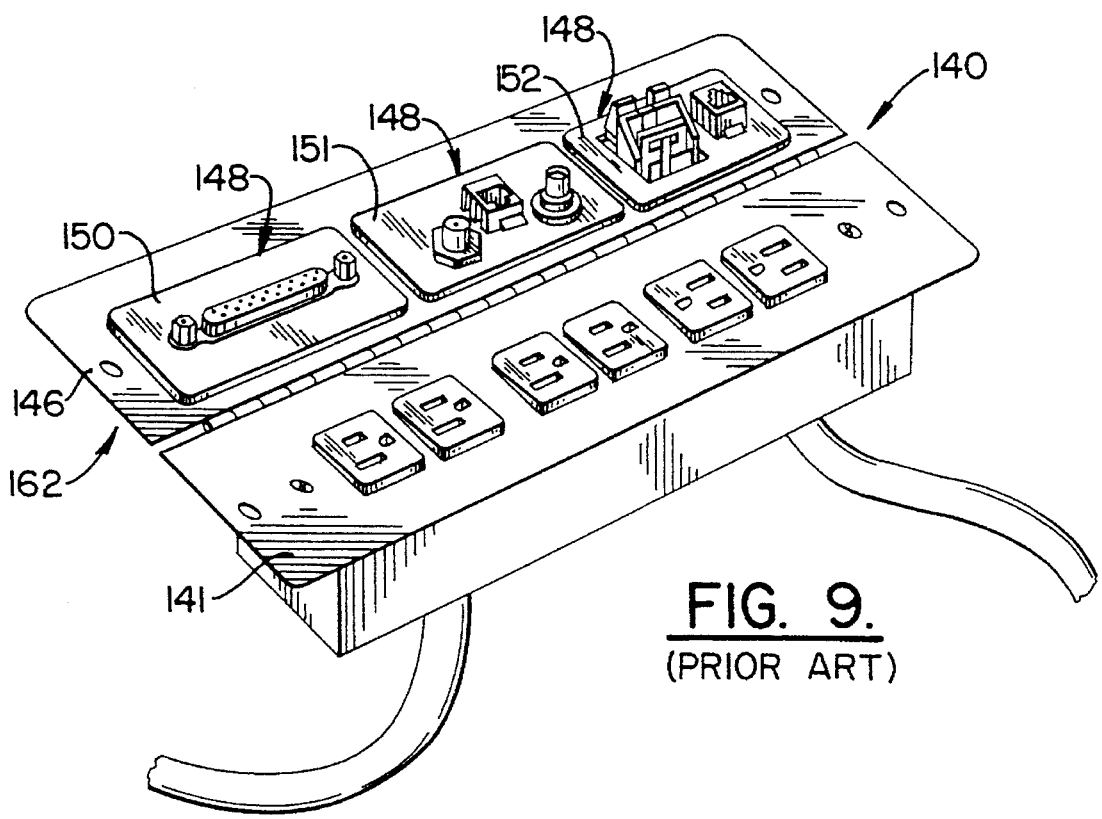
FIG. 9 is an isometric view of a cable harness having a pivotable carrier plate that includes only telecommunication receptacles.

The ease with which the harness 40 can be reconfigured is not present in the prior art harness 140 illustrated in FIG. 9. This harness includes a stationary plate 141 hingedly interconnected with a carrier plate 146; however, a row of six power receptacles is located on the stationary plate, and only the row of voice/data receptacles 148 and received connectors 150, 151, 152 are located on the carrier plate. As the carrier plate moves to the open position, access to the rear surface 162 of the carrier plate 146 is severely limited. First, the presence of plugs of the power cables received in the power receptacles limits the pivotal movement of the carrier plate unless each of these plugs is removed from its receiving receptacle. Second, the rear access aperture in the rear panel is sufficiently narrow that most individuals have great difficulty in reaching through the aperture to grasp and manipulate the cables attached to the rear surface of the carrier plate. This difficulty is exacerbated when the harness is mounted just beneath the lower side of a work surface, as is preferred. As a result, often cables leading between the rear surfaces of the voice/data connectors and external sources can only be accessed by moving the furniture system to which the harness is attached away from the wall, which is one of the inconveniences that use of the harness is intended to eliminate. In contrast, the present invention provides much greater forward access to the rear surface of the carrier plate, and does so with a configuration that does not require that the furniture system be moved from the wall.

The foregoing embodiments are illustrative of the present invention, and are not to be construed as limiting thereof.

The invention is defined by the following claims, with equivalents of the claims to be included therein.

That which is claimed is:

1. An electronic cable harness comprising:
   a stationary plate having an upper edge portion and a front surface adapted for fixed attachment with a panel of a furniture system; and
   a carrier plate having a front surface, an opposing rear surface, and a lower edge portion pivotally interconnected with said stationary plate upper edge portion, said carrier plate including a first plurality of apertures configured to receive electrical power receptacles, said apertures being serially aligned in a first lower row, and a second plurality of apertures configured to receive electronic cable connectors, said apertures being serially aligned in a second upper row, said first lower row being located between said carrier plate lower edge portion and said second upper row;
   wherein said carrier plate is pivotable between a closed position, in which said carrier plate front surface and said stationary front surface each face forwardly, and an open position, in which said carrier front surface faces downwardly and rearwardly and said stationary plate front surface faces forwardly, so that said carrier plate rear surface can be forwardly accessed.

2. The electronic cable harness of claim 1, wherein in the closed position, said carrier plate front surface is substantially coplanar with said stationary plate front surface.

3. The electronic cable harness of claim 1 further comprising at least one electronic cable connector matably received within one of said plurality of apertures in said upper row.

4. The electronic cable harness of claim 1, further comprising at least one electric power receptacle matably received within one of said plurality of apertures in said lower row.

5. The electronic cable harness of claim 4, further comprising an electrical power cable electrically connected with said at least one power receptacle, said cable extending from the rear surface of said power receptacle.

6. The electronic cable harness of claim 1, wherein in the open position, said carrier plate front surface forms an angle with said stationary front surface of between about 10 and 30 degrees.

7. The electronic cable harness of claim 1, further comprising a support frame comprising:
   a mounting frame fixed to said stationary plate and adapted for fixed attachment to a panel of a furniture piece, said mounting frame being configured to space said stationary plate and said carrier plate away from the furniture piece panel a distance sufficient to enable rearwardly-approaching cables to connect with power receptacles and electronic connectors mounted in the apertures of said upper and lower rows.

8. The electronic cable harness of claim 7, wherein said mounting frame further includes an opening rearward of said carrier plate, said opening being sized to enable power receptacles mounted in said first plurality of apertures and electronic connectors mounted in said second plurality of apertures to receive rearwardly-approaching cables therein.

9. A furniture system comprising:
   a base having a generally upright panel, said panel having a front surface and a rear surface; and
   an electronic cable harness comprising:
      a stationary plate having an upper edge portion and a front surface;

a carrier plate having a front surface, an opposing rear surface, and a lower edge portion pivotally interconnected with said stationary plate upper edge portion, said carrier plate including a first plurality of apertures configured to receive electrical power receptacles, said apertures being serially aligned in a first lower row, and a second plurality of apertures configured to receive electronic cable connectors, said apertures being serially aligned in a second upper row, said first lower row being located between said carrier plate lower edge portion and said second upper row; and means for fixedly mounting said harness stationary plate to said base panel front surface so that said stationary plate front surface is forwardly facing;

wherein said carrier plate is pivotable between a closed position, in which said carrier plate front surface and said stationary plate front surface each face forwardly, and an open position, in which said carrier front surface faces downwardly and rearwardly, and said stationary plate front surface faces forwardly, so that said carrier plate rear surface can be forwardly accessed.

10. The furniture system of claim 9, wherein in the closed position, said carrier plate front surface is substantially coplanar with said stationary plate front surface.

11. The furniture system of claim 9, wherein said base panel includes an aperture sized and configured to enable power receptacles mounted in said first plurality of apertures and electronic connectors mounted in said second plurality of apertures to receive rearwardly-approaching cables therein.

12. The furniture system of claim 9, further comprising at least one electronic cable connector matably received within one of said plurality of apertures in said upper row.

13. The furniture system of claim 9, further comprising at least one electric power receptacle matably received within one of said plurality of apertures in said lower row.

14. The furniture system of claim 9, further comprising an electrical power cable electrically connected with said at least one power receptacle, said cable extending from the rear surface of said power receptacle.

15. The furniture system of claim 9, wherein in the open position, said carrier plate front surface forms an angle with said stationary front surface of between about 10 and 30 degrees.

16. The furniture system of claim 9, wherein said base further comprises a generally horizontal support surface intersecting said base panel substantially orthogonally.

17. The furniture system of claim 16, wherein said electronic harness is mounted so that said stationary plate upper edge portion is positioned between about 4 and 9 inches below said horizontal support surface.

18. The furniture system of claim 9 further comprising a support frame comprising:

a mounting frame fixed to said stationary plate and adapted for fixed attachment to a vertical panel of a furniture piece, said mounting frame being configured to space said stationary plate and said carrier plate away from the furniture piece panel a distance sufficient to enable cables rearwardly-approaching cables to connect with power receptacles and electronic connectors mounted in the apertures of said upper and lower rows.

19. The furniture system of claim 18, wherein said mounting frame further includes an opening rearward of said carrier plate, said opening being sized to enable power receptacles mounted in said first plurality of apertures and electronic connectors mounted in said second plurality of apertures to receive rearwardly-approaching cables therein.

20. A furniture system comprising:
(a) a base having a generally upright panel, said panel having a front surface and a rear surface, said base comprising;
a generally horizontal support surface intersecting said base panel substantially orthogonally, wherein said support surface further comprises at least one aperture; said furniture system further comprising
(b) an electronic cable harness comprising;
a stationary plate having an upper edge portion and a front surface;
a carrier plate having a front surface, an opposing rear surface, and a lower edge portion pivotally interconnected with said stationary plate upper edge portion, said carrier plate including a first plurality of apertures configured to receive electrical power receptacles, said apertures being serially aligned in a first lower row, and a second plurality of apertures configured to receive electronic cable connectors, said apertures being serially aligned in a second upper row, said first lower row being located between said carrier plate lower edge portion and said second upper row;
(c) means for fixedly mounting said harness stationary plate to said base panel front surface so that said stationary plate front surface is forwardly facing;
wherein said carrier plate is pivotable between a closed position, in which said carrier plate front surface and said stationary plate front surface each face forwardly, and an open position, in which said carrier front surface faces downwardly and rearwardly, and said stationary plate front surface faces forwardly, so that said carrier plate rear surface can be forwardly accessed;
and wherein said upright panel further comprises means for capturing and guiding a cable connected with one of said receptacles of said upper or said lower row to said at least one support surface aperture.

* * * * *

UNITED STATES PATENT AND TRADEMARK OFFICE
CERTIFICATE OF CORRECTION

PATENT NO. : 5,516,298
DATED : May 14, 1996
INVENTOR(S) : Robert H. Smith

It is certified that error appears in the above-indentified patent and that said Letters Patent is hereby corrected as shown below:

At column 7, line 9, delete "42'" and insert --41'--.

Signed and Sealed this

Twenty-second Day of October, 1996

Attest:

BRUCE LEHMAN

*Attesting Officer*  *Commissioner of Patents and Trademarks*